(12) United States Patent
Torok et al.

(10) Patent No.: US 9,026,735 B1
(45) Date of Patent: May 5, 2015

(54) METHOD AND APPARATUS FOR AUTOMATED DIVISION OF A MULTI-BUFFER

(71) Applicants: Ruven Torok, Tel Aviv (IL); Oren Shafrir, Tel Aviv (IL)

(72) Inventors: Ruven Torok, Tel Aviv (IL); Oren Shafrir, Tel Aviv (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 250 days.

(21) Appl. No.: 13/678,304

(22) Filed: Nov. 15, 2012

Related U.S. Application Data

(60) Provisional application No. 61/561,383, filed on Nov. 18, 2011.

(51) Int. Cl.
*G06F 12/00* (2006.01)
*G06F 12/02* (2006.01)
*G06F 5/06* (2006.01)
*G06F 12/08* (2006.01)

(52) U.S. Cl.
CPC ............ *G06F 12/02* (2013.01); *G06F 5/065* (2013.01); *G06F 12/084* (2013.01); *G06F 12/023* (2013.01); *G06F 12/0871* (2013.01)

(58) Field of Classification Search
CPC .. G06F 12/023; G06F 12/084; G06F 12/0871
See application file for complete search history.

(56) References Cited

U.S. PATENT DOCUMENTS 6,094,695 A * 7/2000 Kornher .................... 710/56
6,441,917 B1 * 8/2002 Ikeda ...................... 358/1.16

* cited by examiner

*Primary Examiner* — Shawn X Gu

(57) ABSTRACT

Systems and methods are provided for a hardware-implemented multi-buffer. A system includes a buffer memory comprising a shared memory space, where the memory space is shared between a first buffer and a second buffer, and where a dynamic delineation of the memory space between the first buffer and the second buffer is identified by a divider address. A dynamic buffer control circuit includes a control memory that is configured to store the divider address, a first memory utilization metric associated with the first buffer, and a second memory utilization metric associated with the second buffer. A system further includes one or more comparator circuits configured to compare the first memory utilization metric and the second memory utilization metric, where the dynamic buffer control circuit changes the divider address based on the comparison.

30 Claims, 9 Drawing Sheets

METHOD AND APPARATUS FOR AUTOMATED DIVISION OF A MULTI-BUFFER

CROSS-REFERENCE TO RELATED APPLICATIONS

This application claims priority to U.S. Provisional Patent Application No. 61/561,383, filed Nov. 18, 2011, entitled "Auto Division of Multi FIFO," which is herein incorporated in its entirety.

FIELD

The technology described herein relates generally to buffer management and more particularly to on-the-fly buffer partitioning.

BACKGROUND

A data buffer is a region in a memory, such as Random Access Memory (RAM) or cache memory, which can be used to temporarily hold data while that data is being moved from one location to another or awaiting consumption. Buffers are often used when there is a difference between the rate at which data is received and the rate at which that data can be processed. Buffers can also be implemented in systems where data processing is asynchronous, where delays may be present between data receipt and data processing.

The description above is presented as a general overview of related art in this field and should not be construed as an admission that any of the information it contains constitutes prior art against the present patent application.

SUMMARY

Examples of systems and methods are provided for a hardware-implemented multi-buffer. A system includes a buffer memory comprising a shared memory space, where the memory space is shared between at least first buffer and a second buffer, and where a dynamic delineation of the memory space between the first buffer and the second buffer is identified by a divider address. A dynamic buffer control circuit includes a control memory that is configured to store the divider address, a first memory utilization metric associated with the first buffer, and a second memory utilization metric associated with the second buffer. A system further includes one or more comparator circuits configured to compare the first memory utilization metric and the second memory utilization metric, where the dynamic buffer control circuit changes the divider address based on the comparison.

As another example, a method includes determining a first memory utilization of a first buffer among a plurality of buffers sharing a memory space and determining a second memory utilization of a second buffer among the plurality of buffers. The memory space is repartitioned by redefining a division of memory space between the first buffer and the second buffer based on the first memory utilization and the second memory utilization.

As a further example, a network data transport device includes a plurality of network ports and a hardware-implemented multi-buffer. The hardware-implemented multi-buffer includes a buffer memory comprising a shared memory space, where the memory space is shared between at least first buffer and a second buffer, and where a dynamic delineation of the memory space between the first buffer and the second buffer is identified by a divider address. A dynamic buffer control circuit includes a control memory that is configured to store the divider address, a first memory utilization metric associated with the first buffer, and a second memory utilization metric associated with the second buffer. The transport device further includes one or more comparator circuits configured to compare the first memory utilization metric and the second memory utilization metric, where the dynamic buffer control circuit changes the divider address based on the comparison.

DETAILED DESCRIPTION

Figures 1A, 1B:
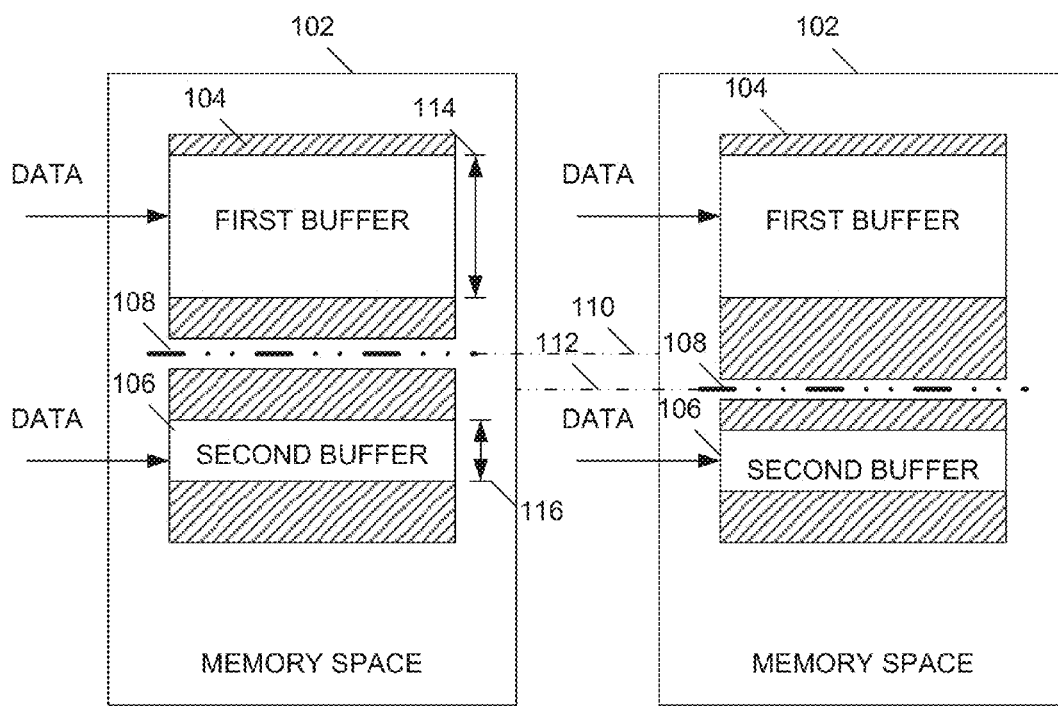
FIGS. 1A and 1B are diagrams depicting performance of a dynamic repartitioning of a memory space that includes a plurality of buffers in accordance with an embodiment of the disclosure.

FIGS. 1A and 1B are diagrams depicting performance of a dynamic repartitioning of a memory space that includes a plurality of buffers in accordance with an embodiment of the disclosure. A shared memory space 102 includes a plurality of buffers that include a first buffer 104 and a second buffer 106. The shared memory space 102 is divided into the plurality of buffers 104, 106 according one or more dividers, such as the divider identified at 108. During operation of the plurality of buffers 104, 106, the shared memory space 102 may be repartitioned by redefining the division of memory space between the first buffer 104 and the second buffer 106, as identified by the position of the divider 108. Such a repartitioning is depicted in the repositioning of the divider from a first address 110 to a second address 112. Such repartitioning increases the amount of memory available to the first buffer 104 while reducing the amount of memory available to the second buffer 106.

In one embodiment of the disclosure, a determination is made as to a first memory utilization 114 in the first buffer among a plurality of buffers sharing a memory space 102. In FIG. 1 and subsequent figures, the white portions of a buffer represent utilized buffer memory, while the shaded areas represent unused buffer memory. A determination is further made of a second memory utilization 116 of a second buffer among the plurality of buffers. The memory space 102 is repartitioned by redefining a division of the memory space 102, as indicated by the divider 108, based on the first memory utilization and the second memory utilization.

The division of the memory space 102 between the first buffer 104 and the second buffer 106 is defined by the divider 108, where the divider is associated with an address in the memory space 102 between the first buffer 104 and the second buffer 106. During repartitioning, the division of the memory space 102 is redefined by changing the address of the divider 108 in the memory space 102, such as from address 110 to address 112, as depicted in FIGS. 1A and 1B. Upon moving the divider 108, the amount of memory allocated to each of the first buffer 104 and the second buffer 106 changes, so that the first buffer 104 is allocated more memory while the second buffer 106 is allocated less memory in FIG. 1B after movement of the divider 108 from address 110 to address 112.

In one embodiment of the disclosure, additional buffers may be encoded on the shared memory space 102, where the boundaries of those additional buffers are delineated by additional dividers associated with memory addresses. For example, in one embodiment, the memory space 102 is encoded with a third buffer among the plurality of buffers. A third memory utilization is determined for the third buffer. A division of the memory space 102 between the second buffer 106 and the third buffer is redefined by changing a second divider associated with an address of the memory space 102 between the second buffer 106 and the third buffer. The address of the second divider is changed based on the determined utilization of the second buffer 106 as well as the determined third memory utilization.

Dynamic buffer memory allocation, as depicted in FIGS. 1A and 1B can provide advantages over static buffers. Static buffers may be permanently sized or may be sized at the beginning of operations based on expected utilization, for instance. Dynamic buffer memory allocation, as depicted in the embodiment of FIGS. 1A and 1B can offer improved performance through adjustment of buffer sizes during operation of those buffers. Buffer sizing can have a significant effect on system performance. When a buffer is filled, that buffer can no longer accept data, slowing the overall rate at which data can be received. When a buffer is not full and can accept more data, that buffer can continue to accept data from a source, regardless of the rate of consumption or processing of the received data by a target.

Static buffers, while relatively simple in structure, cannot adapt to address the current state of data processing. When certain buffers are being heavily utilized, while other buffers are being little utilized, the heavily utilized buffers may reach a full state, regardless of the existence of unused buffer memory in the little utilized buffers. While the relative sizes of static buffers can be manually adjusted to address such a scenario when the future buffer utilization is known, such static buffers may be a less than optimal solution when future buffer utilization is unknown. Dynamic buffer memory allocation, as disclosed in certain embodiments herein, enables adaptation to the current buffer usage environment by increasing the amount of memory allocated to heavily utilized buffers to avoid buffer overruns by reducing the memory allocated to buffers that are currently being utilized at low levels of capacity.

For example, a buffer for buffering packets from a first flow that is being received at a given point in time faster than the received packets can be re-transmitted, such as during a spike in traffic, could run out of buffer space, resulting in packet loss, without on-the-fly dynamic buffer memory allocation adding memory to the allocation to the filling buffer. Conversely, when the device is able to re-transmit packets faster than the packets are being received, the buffer may run empty, resulting in unused memory space that can be reallocated to a buffer that is currently in a higher state of usage.

The buffers 104, 106 of FIGS. 1A and 1B may take a variety of forms. For example, the buffers 104, 106 may be encoded onto different types of memory spaces, such as a Random Access Memory (RAM) memory space or a cache memory space. In the example of FIGS. 1A and 1B, low memory addresses are depicted at the top of the memory space, with high memory addresses being depicted at the bottom of the memory space. Each of the buffers 104, 106 is filled from low memory addresses toward high memory addresses. The first buffer 104 is prevented from accessing memory past the divider address 108, and the second buffer 106 is prevented from accessing memory before the divider address 108.

The buffers may be implemented using a variety of data structures such as a stack, a queue, a cache, a look-up table, as well as others. In an embodiment of the disclosure, the buffers 104, 106 take the form of circular first-in-first-out (FIFO) queues. In such a FIFO buffer, a first data element provided to the FIFO buffer by a data source, such as a packet source, is the first data element provided to the data destination, when the data destination, such as a packet destination, is available to accept the first data element. The FIFO buffer may be implemented as a circular buffer, whereupon filling the FIFO buffer to a maximum address in the memory space assigned to the FIFO buffer, the FIFO buffer continues storing additional received data elements at the minimum addresses of the FIFO buffer, provided the data elements from those minimum addresses have been previously transmitted and cleared from the FIFO buffer. Such a configuration can ensure continued operation of the FIFO buffer after filling to the maximum address assigned to the FIFO buffer, as long as sufficient free memory is available at the lower addresses of the FIFO buffer. It is noted that a FIFO buffer can also be filled from high addresses to low addresses, for example.

Figure 2:
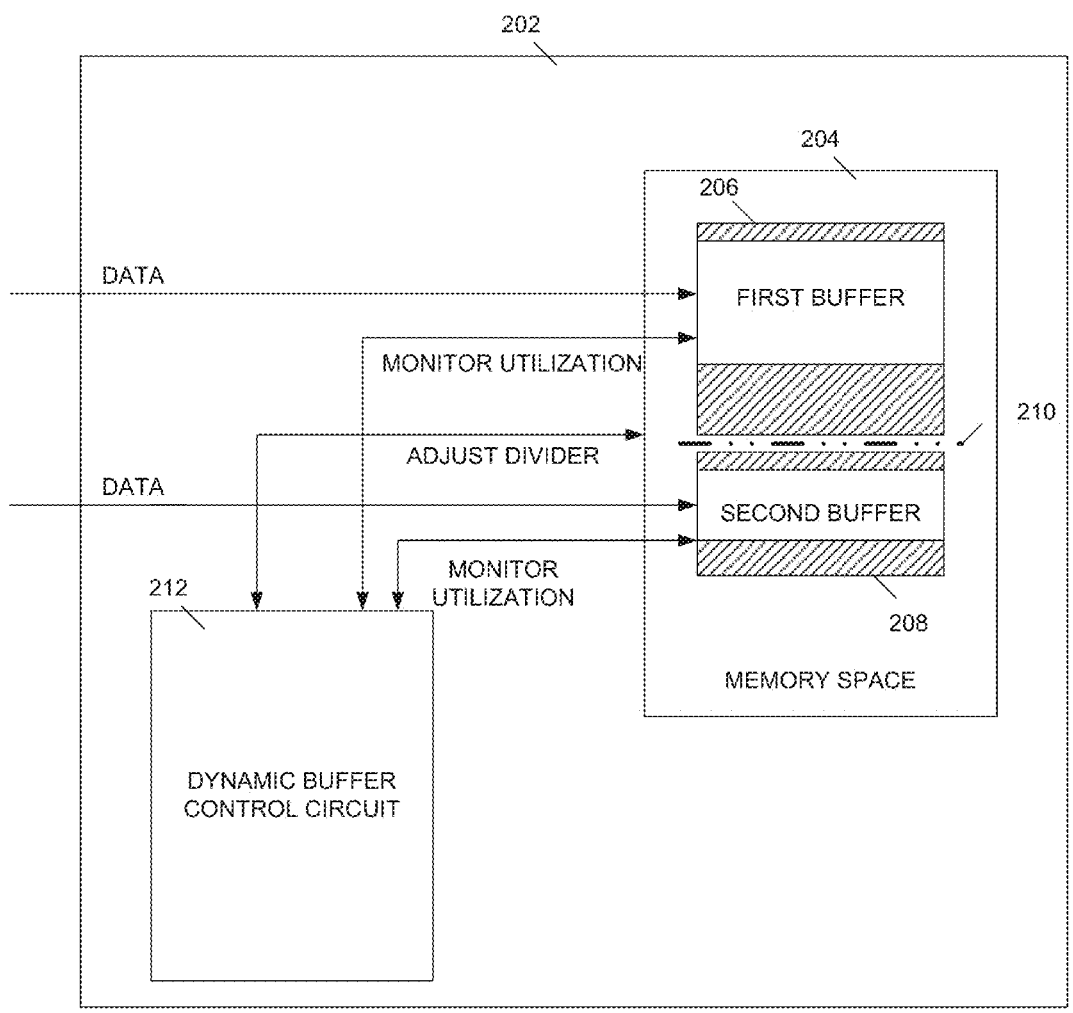
FIG. 2 is a block diagram depicting a hardware-implemented multi-buffer in accordance with an embodiment of the disclosure.

FIG. 2 is a block diagram depicting a hardware-implemented multi-buffer in accordance with one embodiment of the disclosure. The hardware implemented multi-buffer 202 includes a buffer memory comprising a memory space 204. The memory space 204 is divided between a first buffer 206 and a second buffer 208, where a dynamic delineation of the memory space 204 between the first buffer 206 and the second buffer 208 is identified by a divider address 210. In an embodiment, a dynamic buffer control unit 212 controls the relative sizes of the first buffer 206 and the second buffer 208 during operation of the multi-buffer 202 by adjusting an address of the divider address 210 based on monitoring of the utilization of the first buffer 206 and the second buffer 208, respectively.

Figure 3:
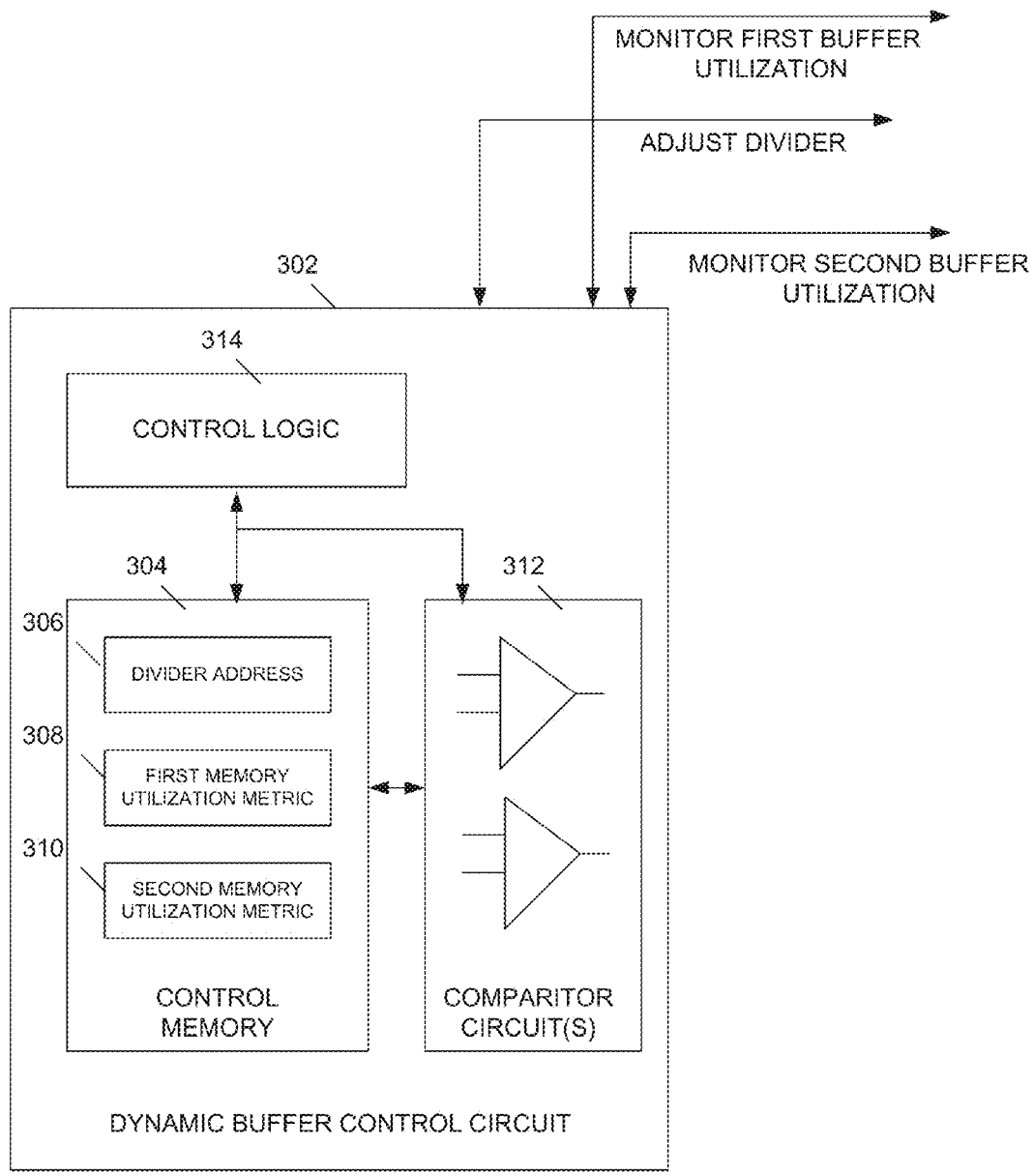
FIG. 3 is a block diagram depicting internal hardware components of a hardware-implemented multi-buffer in accordance with an embodiment of the disclosure.

FIG. 3 is a block diagram depicting internal hardware components of a hardware-implemented multi-buffer in accordance with one embodiment of the disclosure. The dynamic buffer control circuit 302 includes a control memory 304. The control memory 304 is configured to store a divider address 306 that corresponds to a division between the first buffer and the second buffer in a memory space. The control memory 304 is further configured to store a first memory utilization metric 308. For example, the first memory utilization metric 308 may be directed to an amount of allocated memory that the first buffer is using. The control memory is also configured to store a second memory utilization metric 310. For example, in one embodiment, the second memory utilization metric 310 is directed to an amount of allocated memory that the second buffer is using. The dynamic buffer control unit 302 further includes one or more comparator circuits 312 that are configured to compare the first memory utilization metric 308 and the second memory utilization metric 310, where the dynamic buffer control circuit 302 changes the divider address 306 based on that comparison, such as via control logic 314 included in the dynamic buffer control circuit 302.

The first memory utilization metric 308 and the second memory utilization metric 310 can take a variety of forms. In one embodiment, the utilization metrics 308, 310 identify a total amount of memory utilized by the buffers associated with the respective utilization metrics. When a disparity in size between the first memory utilization metric 308 and the second memory utilization metric 310 exists, the relative sizes of the buffers can be adjusted through changing the divider address 306. Alternative embodiments may adjust the relative sizes of the buffers based on absolute amounts of memory not used, proportional amounts of allocated memory used, or any other suitable measure of utilization.

In another embodiment, the first memory utilization metric for a first FIFO buffer tracks a first head pointer address and a first tail pointer address associated with the first FIFO buffer. The first tail pointer address points to a data element that has been in the first FIFO buffer the longest, and the first head pointer address points to a data element that has been added to the FIFO buffer most recently. The current memory utilization of the first FIFO buffer can be determined based on the first tail pointer address and the first head pointer address. The memory utilization of a second FIFO buffer can be similarly tracked and determined through storage of a second head pointer address and a second tail pointer address.

Figure 4:
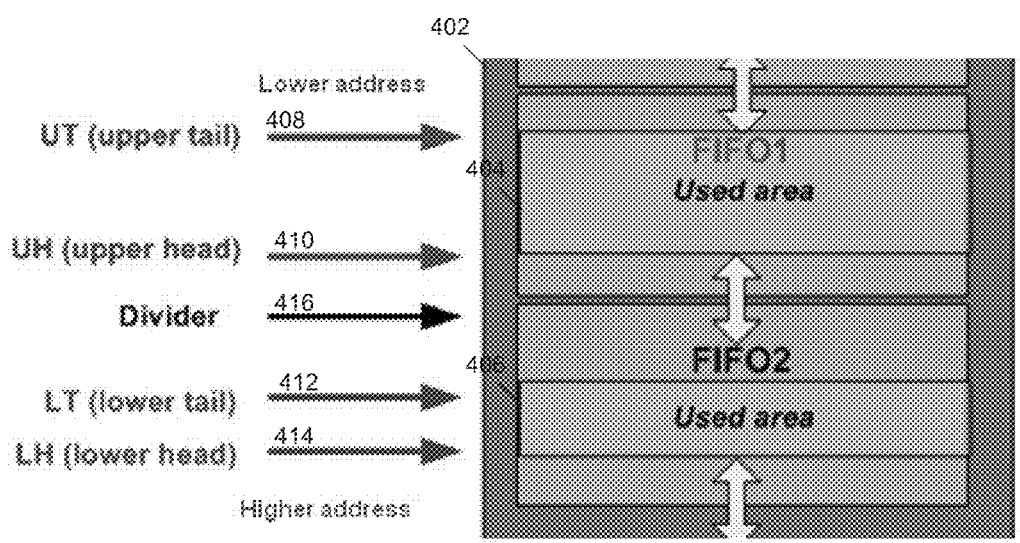
FIG. 4 is a diagram depicting relative positions of head pointers, tail pointers, and a divider address in accordance with an embodiment of the disclosure.

FIG. 4 is a diagram depicting relative positions of head pointers, tail pointers, and a divider address in accordance with an embodiment of the disclosure. A memory space 402 is encoded with a plurality of FIFO buffers, including FIFO1 404 and FIFO2 406. Lower addresses of the memory space 402 are depicted at the top of FIG. 4, while higher addresses are depicted at the bottom of FIG. 4. An upper tail pointer (UT) 408 is tracked by a dynamic buffer control circuit. UT 408 identifies the location of a data element in FIFO1 404 that has been in FIFO1 404 the longest. The data element at UT 408 will be the next data element to be transmitted from FIFO1 404. An upper head pointer (UH) 410 is also tracked by the dynamic buffer control circuit and identifies the location of a data element in FIFO1 404 that has most recently been added to FIFO1 404. The data element at UH 410 is at the end of the FIFO1 404 queue. The memory utilization of FIFO1 404 can be determined by subtracting the UT 408 address from the UH 410 address.

Corresponding pointers are tracked for FIFO 2 406. Specifically, a lower tail pointer (LT) 412 is tracked by the dynamic buffer control circuit. LT 412 identifies the location of a data element in FIFO2 406 that has been in FIFO2 406 the longest. The data element at LT 412 will be the next data element to be transmitted from FIFO2 406. A lower head pointer (LH) 414 is also tracked by the dynamic buffer control circuit and identifies the location of a data element in FIFO2 406 that has most recently been added to FIFO2 406. The data element at LH 414 is at the end of the FIFO2 406 queue. The memory utilization of FIFO2 406 can be determined by subtracting the LT 412 address from the LH 414 address.

A divider address 416 delineates the boundary between FIFO1 404 and FIFO2 406. When inputting data elements into FIFO1, those data elements may not be inputted at a higher address than the divider address 416, and thus, UH 410 cannot extend below the divider address 416. In implementations using a circular FIFO queue, when a data element is inputted, and there is no room to place the inputted data element at the end of the FIFO1 404 queue because UH 410 has reached the divider address 416, the inputted data element can be placed at the low address end of FIFO1 404 (i.e., at the divider between FIFO1 404 and a previous buffer or at the beginning of set of buffers when FIFO1 404 is the first buffer in the memory space 402). UH 410 is moved to point at the newly inputted data element at the low address end of FIFO1 404, and FIFO1 404 is then in a wrap-around condition where UT 408 is greater than UH 410. A dynamic buffer control circuit may treat wrap around conditions as a special case when determining whether to expand or contract allocated buffer memories, as described further below.

Figure 5:
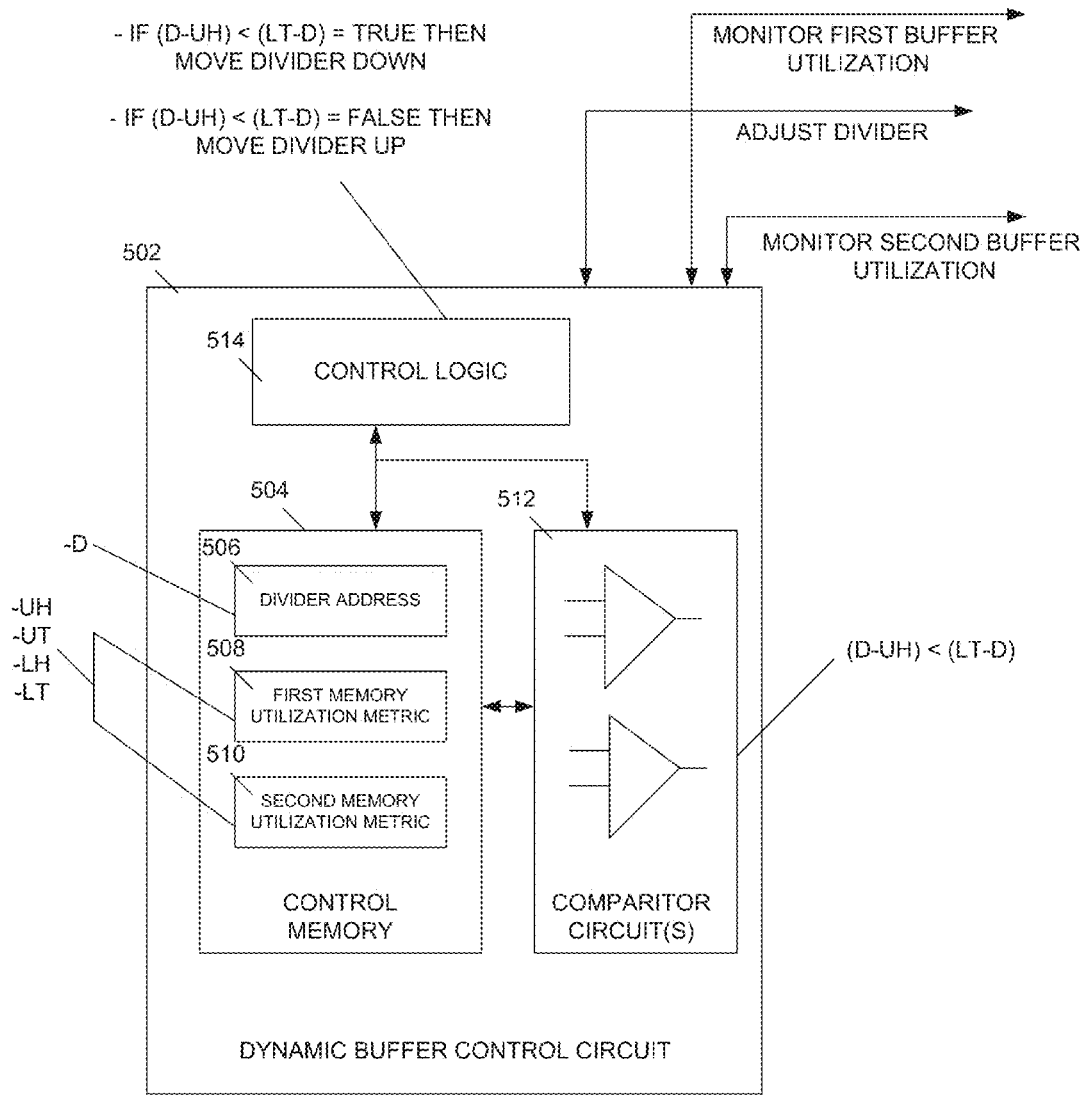
FIG. 5 is a block diagram depicting example divider address moving control logic in accordance with an embodiment of the disclosure.

FIG. 5 is a block diagram depicting example divider address moving control logic in one embodiment of the disclosure. A dynamic buffer control circuit 502 includes a control memory 504 for storage of certain metrics. The stored metrics include a divider address (D) 506, first memory utilization metrics (UH, UT) 508 associated with a first buffer, and second memory utilization metrics (LH, LT) 510 associated with a second buffer. A set of one or more comparator circuits 512 is configured to make comparisons to determine whether the dynamic buffer control circuit 502 should adjust the divider address 506 between a first buffer and a second buffer to change the amount of memory allocated to those buffers. In one embodiment of the disclosure, the control logic 514 directs the one or more comparator circuits 512 to perform a determination of whether (D−UH)<(LT−D). In other words, the comparator 512 is tasked with determining whether the unused, higher address portion of the first buffer less than the unused, lower address portion of the second buffer. If the unused portion of the first buffer is less than the unused portion of the second buffer, then the divider address 506 is moved down, to a higher address, enabling the first buffer to take advantage of some of the unused memory previously allocated to the second buffer. If the unused portion of the first buffer is greater than the unused portion of the second buffer, then the divider address 506 is moved up, to a lower address, enabling the second buffer to take advantage of some of the unused memory previously allocated to the first buffer. The size of the change in the divider address 506 can be based on the magnitude of the difference between (D−UH) and (LT−D) or may be a predetermined amount.

In another embodiment of the disclosure, the comparator circuits 512 are configured to make comparisons to determine whether the dynamic buffer control circuit 502 should adjust the divider address 506 based on the total amount of unused space in each buffer. The control logic 514 directs the one or more comparator circuits 512 to perform a determination of whether (FirstFifoSize−(UH−UT))<(SecondFifoSize−(LH−LT)). In other words, the comparator 512 is tasked with determining whether the unused portion of the second buffer is greater than the unused portion of the first buffer. If the unused portion of the second buffer is greater than the unused portion of the first buffer, then the divider address 506 is moved down, to a higher address, enabling the first buffer to take advantage of some of the unused memory previously allocated to the second buffer. If the unused portion of the first buffer is greater than the unused portion of the second buffer, then the divider address 506 is moved up, to a lower address, enabling the second buffer to take advantage of some of the unused memory previously allocated to the first buffer.

Divider addresses between other buffers can be similarly managed. For example, in one embodiment, the memory space is divided among the first buffer, the second buffer, and a third buffer. The dynamic delineation of the memory space among the first buffer, the second buffer, and the third buffer is identified by the divider address 506, which identifies the boundary between the first buffer and the second buffer, and a second divider address, which identifies a boundary between the second buffer and the third buffer. The control memory 504 is configured to store the second divider address and one or more third memory utilization metrics associated with the third buffer (e.g., a third buffer head address and a third buffer tail address). The one or more comparator circuits 512 are configured to compare one or more second memory utilization metrics 510 to one or more third memory utilization metrics, and the dynamic buffer control circuit 502 is configured to change the second divider address based on that comparison.

Figure 6:
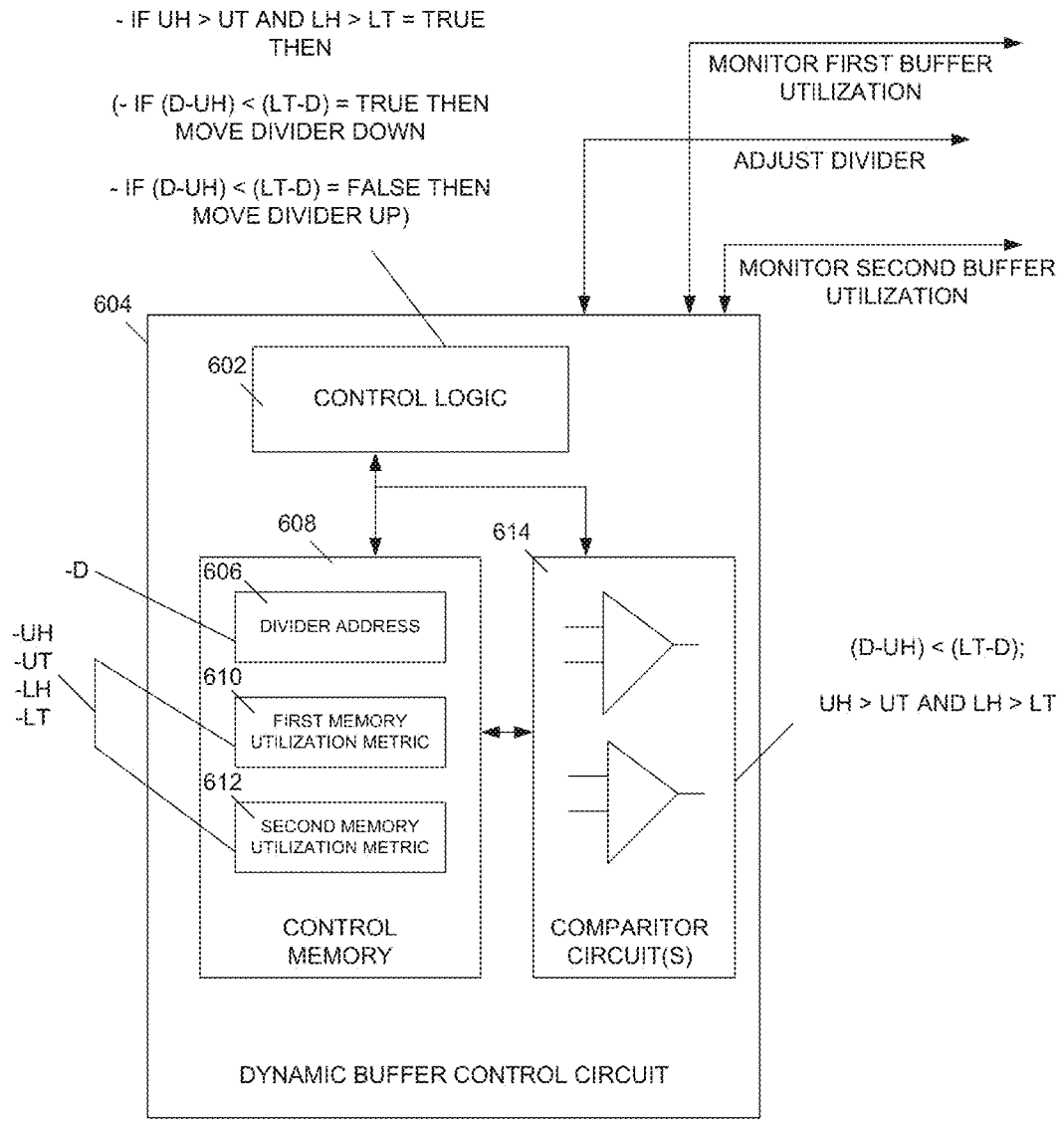
FIG. 6 is a block diagram depicting control logic that includes handling of wrap-around conditions in accordance with an embodiment of the disclosure.

FIG. 6 is a block diagram depicting control logic that includes handling of wrap-around conditions in accordance with an embodiment of the disclosure. In the embodiment of FIG. 6, the control logic 602 of a dynamic buffer control circuit 604 directs that a divider address 606 should not be moved when one of the two buffers whose boundary is identified by the divider address 606 is in a wrap-around condition. A control memory 608 stores the divider address 606, first memory utilization metrics 610, and second memory utilization metrics 612. The control logic 602 directs the comparator circuits 614 to determine whether either of the first buffer or the second buffer is in a wrap-around condition. A wrap-around condition at a buffer can be detected when the head pointer for the buffer is at a lower address than the tail pointer for the buffer. Thus, if the comparator circuits 614 determine that (UH>UT and LH>LT) is false, then the divider address 606 between the first buffer and the second buffer is not to be moved. If neither of the first buffer nor the second buffer is in a wrap-around condition, then the control logic continues operations to determine whether the divider address 606 is to be moved. If (D−UH) is determined by the comparator circuits 614 to be less than (LT−D), then the dynamic buffer control circuit 604 moves the divider down by increasing the divider address 606, and if (D−UH) is determined by the comparator circuits 614 to be greater than (LT−D), then the dynamic buffer control circuit 604 moves the divider up by decreasing the divider address 606.

Figure 7:
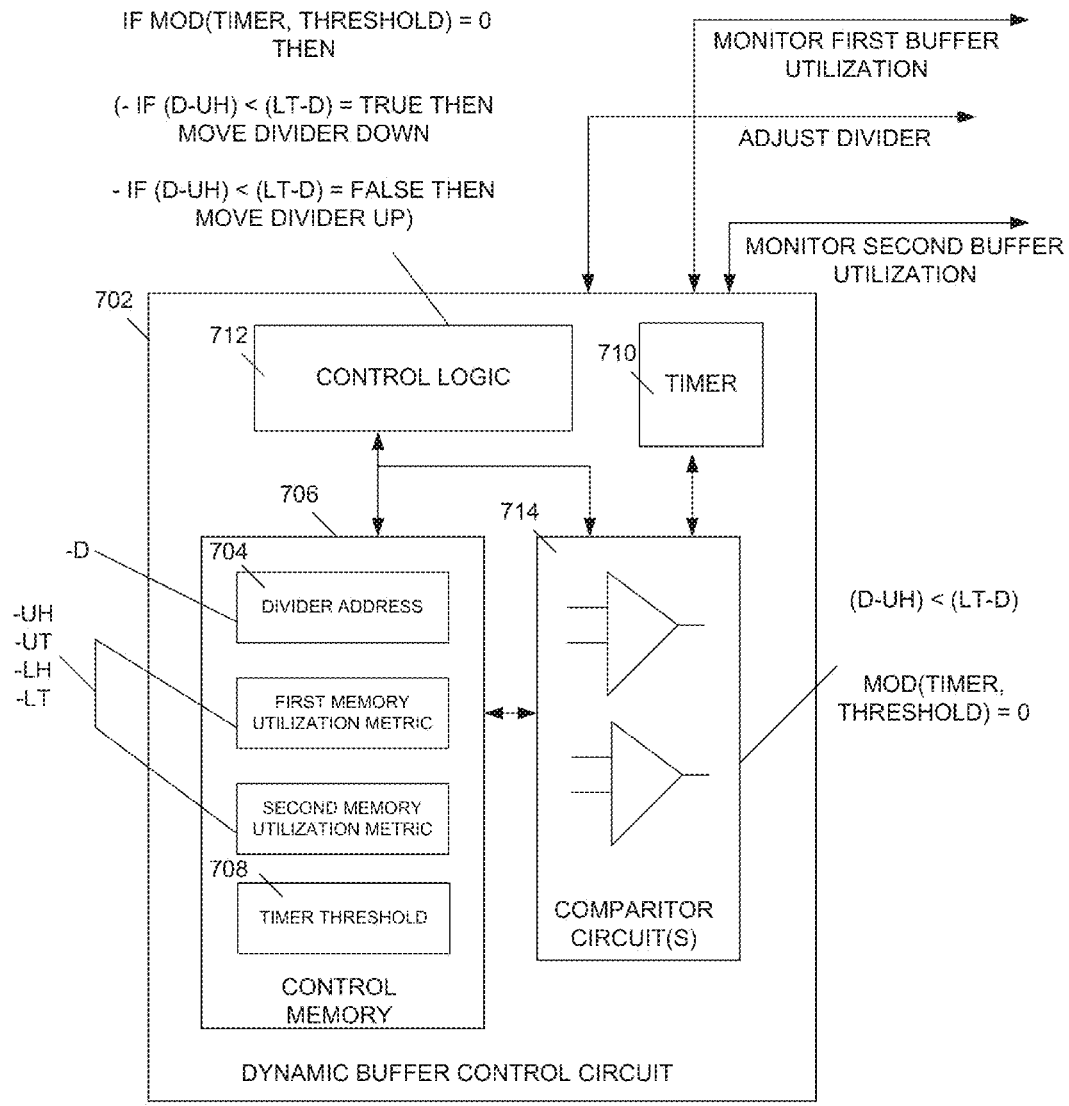
FIG. 7 is a block diagram depicting control logic periodically adjusting a divider address in accordance with an embodiment of the disclosure.

FIG. 7 is a block diagram depicting control logic periodically adjusting a divider address in accordance with an embodiment of the disclosure. Periodic adjustment of memory allocations during operation of a set of buffers enables adjustment of those memory allocations in according with current system conditions. Spacing adjustments at least a predetermined period of time apart ensures that changes are not made too rapidly in a manner that may disrupt system operation. In one embodiment, a dynamic buffer control circuit 702 periodically adjusts a divider address 704 stored by a control memory 706 according to a timer threshold 708. The dynamic buffer control circuit 702 includes a timer 710. Control logic 712 utilizes comparator circuits 714 to determine whether it is time to consider adjusting the divider address 704. In one embodiment, that determination is made by performing a modulo operation on the timer value 710 to determine whether the remainder present after dividing the timer value 710 by the timer threshold value 708 is equal to zero. When MOD(Timer, Threshold)=0, it is time to consider adjusting the divider address 704. At that time, if (D−UH) is determined by the comparator circuits 714 to be less than (LT−D), then the dynamic buffer control circuit 702 moves the divider down by increasing the divider address 704, and if (D−UH) is determined by the comparator circuits 714 to be greater than (LT−D), then the dynamic buffer control circuit 702 moves the divider up by decreasing the divider address 704.

In other embodiments of the disclosure, a dynamic buffer control circuit 702 may consider other constraints in determining whether divider addresses 704 should be moved. For example, a dynamic buffer control circuit 702 may consider a minimum buffer size constraint. In such an embodiment, the control memory 706 stores a minimum size threshold (ST), a first divider address (D) 704, and a second divider address (SD). The comparator circuits 714 determine whether SD−D<ST, and the dynamic buffer control circuit 702 is configured to prevent change of D or SD when SD−D<ST is true. Similar operations can be performed to prevent any buffer from exceeding a maximum size threshold.

A dynamic buffer control circuit can be utilized in a variety of environments. For example, a dynamic buffer control circuit may be utilized in a network receiver that receives data associated with a plurality of ports. Each port is associated with a different application or hardware element at a computing-system associated with the receiver. The data handling or consumption rates of the different applications and hardware elements may vary, and the rates at which data is received on the different ports may vary as well, making a set of buffers, one assigned to each receiving port, beneficial in maintaining data flow.

Figure 8:
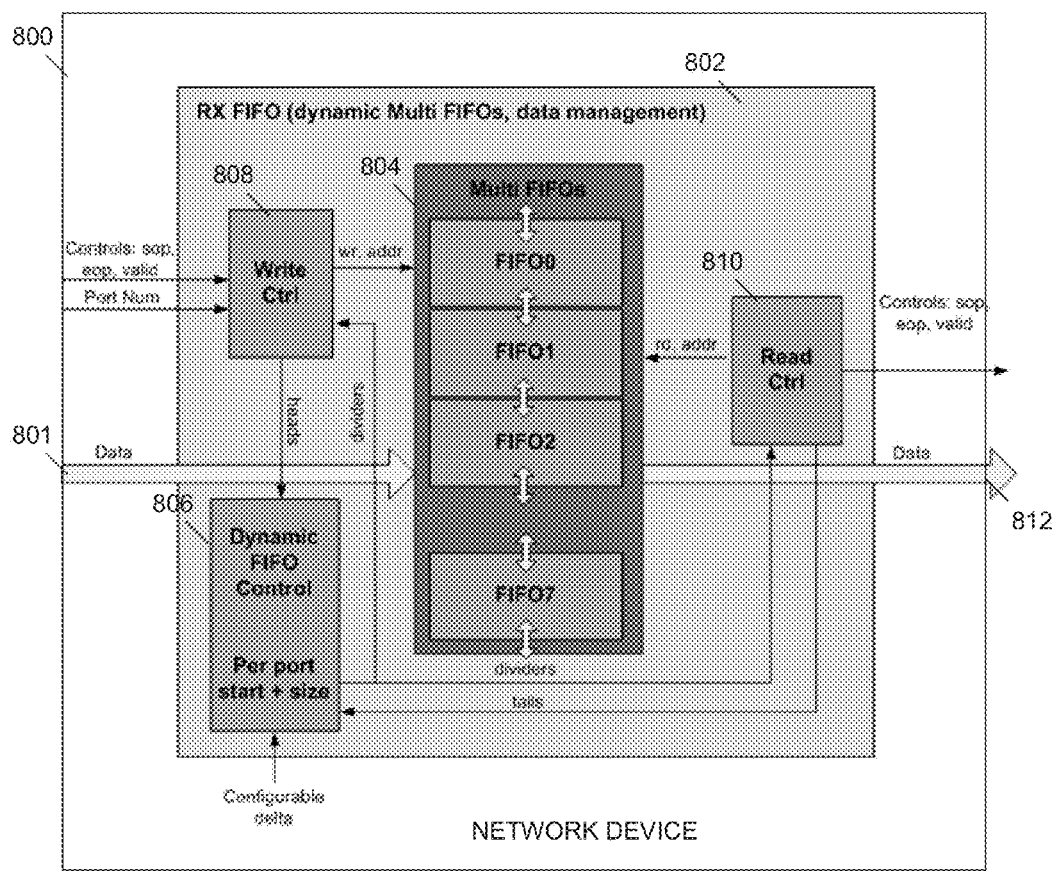
FIG. 8 is a block diagram depicting a receiver that includes a dynamic FIFO control in accordance with an embodiment of the disclosure.

FIG. 8 is a block diagram depicting a receiver that includes a dynamic FIFO control, in accordance with an embodiment of the disclosure. In an embodiment, a receiver 802 is disposed in a network device 800 such as a switch, server or gateway that is configured to receive data through a number of input ports 801. The receiver 802 includes a memory space 804 that is divided among a plurality of FIFO buffers. Dynamic delineations of the memory space 804 into the FIFO buffers are identified by divider addresses that are stored and managed by a dynamic FIFO control hardware module 806. The dynamic FIFO control 806 performs certain operations as described herein above, such as divider adjustments, timer monitoring, wrap-around monitoring, and minimum and maximum buffer size monitoring.

In operation, data is received at the receiver 802, where the received data includes an indication of the port to which that data is destined. The receiver 802 stores that received data in a FIFO buffer that is associated with the port identified by the received data. A write control circuit 808 directs the received data to an address in the memory space 804 that is associated with the correct FIFO buffer for the identified port. Specifically, the write control circuit 808 writes the data to the address that follows the current head pointer address of the correct FIFO buffer, increases that head pointer address, and informs the dynamic FIFO control 806 of the head pointer address change, so that the dynamic FIFO control 806 can adjust the associated buffer utilization metrics accordingly. The write control circuit 808 receives the divider addresses from the dynamic FIFO control 806, so that data is not written to the correct FIFO at an address that is beyond the divider address that identifies the end of the memory allocation of the correct FIFO. If writing to the next address of the correct FIFO would run beyond that divider address, then the write control circuit 808 is configured to write the received data at the beginning of the correct FIFO, resulting in a wrap-around condition.

The receiver 802 also includes a read control circuit 810 that controls access to data stored in the memory space 804 by applications or hardware of the computer system associated with the receiver 802. The read control circuit 810 tracks tail pointers for each of the FIFO buffers indicating the data element that has been in those buffers the longest and is next to be outputted from the receiver 802. When an application or hardware is ready to receive data transmitted to a particular port, the read control circuit 810 is notified, the read control circuit 810 accesses data at the tail address associated with the buffer for that port, and the read control circuit 810 outputs the accessed data to the requesting application or hardware via output ports 812. The read control circuit 810 further increments the tail address for that buffer, as long as such an increment would not pass a divider address, provided by the dynamic FIFO control 806, associated with that buffer. If such a divider address would be exceeded, the read control circuit resets the tail address to the top (e.g., lowest address) of the buffer, ending a wrap-around condition for that buffer. The read control circuit 810 provides the updated tail address to the dynamic FIFO control 806 so that the appropriate buffer utilization metrics can be updated.

Figure 9:
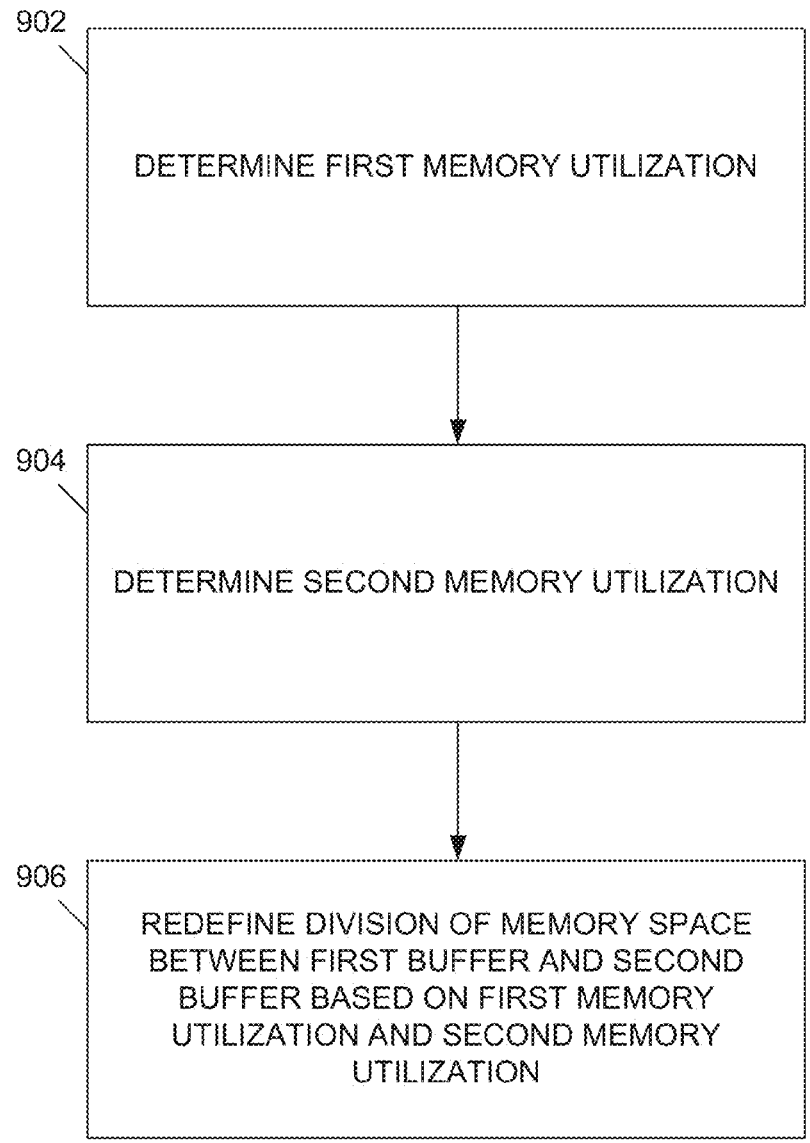
FIG. 9 is a flow diagram depicting steps of a method in accordance with an embodiment of the disclosure.

FIG. 9 is a flow diagram depicting steps of a method in accordance with an embodiment of the disclosure. At 902, a determination is made of a first memory utilization of a first buffer among a plurality of buffers sharing a memory space. At 904, a second memory utilization is determined for a second buffer among the plurality of buffers. At 906, the memory space is repartitioned by redefining a division of the memory space between the first buffer and the second buffer based on the first memory utilization and the second memory utilization.

This application uses examples to illustrate the invention. The patentable scope of the invention may include other examples.

What is claimed is:

1. A hardware-implemented multi-buffer, comprising:
   a buffer memory comprising a shared memory space, wherein the memory space is shared between at least a first buffer and a second buffer, and wherein a dynamic delineation of the memory space between the first buffer and the second buffer is identified by a divider address;
   a dynamic buffer control circuit, wherein the dynamic buffer control circuit comprises:
      a control memory configured to store:
         the divider address;
         a first memory utilization metric associated with the first buffer; and
         a second memory utilization metric associated with the second buffer; and
      one or more comparator circuits configured to compare the first memory utilization metric and the second memory utilization metric, wherein the dynamic buffer control circuit is configured to change the divider address based on the comparison.

2. The multi-buffer of claim 1, wherein the multi-buffer is configured to prevent the first buffer from accessing buffer memory past the divider address, and wherein the multi-buffer is configured to prevent the second buffer from accessing buffer memory before the divider address.

3. The multi-buffer of claim 1, wherein the first buffer and the second buffer are first-in-first-out buffers;
   wherein the control memory is configured to store an upper head address, an upper tail address, a lower head address, and a lower tail address.

4. The multi-buffer of claim 3, wherein the one or more comparator circuits are configured to determine whether:

$$(D-UH)<(LT-D);$$

wherein D is the divider address, UH is the upper head address, and LT is the lower tail address;
   wherein the dynamic buffer control circuit is configured to change the divider address in a first direction when $(D-UH)<(LT-D)$ is true, and wherein the dynamic buffer control circuit is configured to change the divider address in a second direction when $(D-UH)<(LT-D)$ is not true.

5. The multi-buffer of claim 3, wherein the one or more comparator circuits are configured to determine whether:
   UH>UT and LH>LT;
   wherein UT is the upper tail address and LH is the lower head address;
   wherein the dynamic buffer control circuit is configured to prevent change of the divider address when UT>UH or LT>LH is true.

6. The multi-buffer of claim 3, further comprising:
   a write control circuit configured to direct incoming data to one of the first buffer or the second buffer, wherein the write control circuit is configured to instruct the dynamic buffer control circuit to increment the upper head address when the incoming data is directed to the first buffer, and wherein the write control circuit is configured to instruct the dynamic buffer control circuit to increment the lower head address when the incoming data is directed to the second buffer.

7. The multi-buffer of claim 3, further comprising:
   a read control circuit configured to read data from one of the first buffer or the second buffer, wherein the read control circuit is configured to instruct the dynamic buffer control circuit to increment the upper tail address when data is read from the first buffer, and wherein the read control circuit is configured to instruct the dynamic buffer control circuit to increment the lower tail address when data is read from the second buffer.

8. The multi-buffer of claim 1, wherein the memory space is divided among the first buffer, the second buffer, and a third buffer, wherein dynamic delineation of the memory space among the first buffer, the second buffer, and the third buffer is identified by the divider address and a second divider address; and
   wherein the control memory is further configured to store the second divider address and a third memory utilization metric associated with the third buffer; and
   wherein the one or more comparator circuits are configured to compare the second memory utilization metric and the third memory utilization metric, wherein the dynamic buffer control circuit changes the second divider address based on the comparison of the second memory utilization metric and the third memory utilization metric.

9. The multi-buffer of claim 8, wherein the control memory is further configured to store a size threshold value;
   wherein the one or more comparator circuits are configured to determine whether:

$$(SD-D)<T;$$

wherein D is the divider address, SD is the second divider address, and T is the size threshold value;
   wherein the dynamic buffer control circuit is configured to prevent change of the divider address or the second divider address when $(SD-D)<T$ is true.

10. The multi-buffer of claim 1, wherein the control memory is configured to store a timing threshold;
   wherein the dynamic buffer control circuit further comprises:
      a timing circuit;
   wherein the one or more comparator circuits are configured to repeat the comparison of the first memory utilization metric and the second memory utilization metric based on the timing circuit and the timing threshold.

11. A method, comprising:
  determining a first memory utilization of a first buffer among a plurality of buffers sharing a memory space, wherein the first memory utilization is determined based on an upper head address and an upper tail address;
  determining a second memory utilization of a second buffer among the plurality of buffers, wherein the second memory utilization is determined based on a lower head address and a lower tail address, and wherein the first buffer and the second buffer are first-in-first-out buffers; and
  repartitioning the memory space by redefining a division of the memory space between the first buffer and the second buffer based on the first memory utilization and the second memory utilization, wherein the division of the memory space is defined by a divider, the divider being associated with a divider address in the memory space between the first buffer and the second buffer, wherein the division of the memory space is redefined by changing the divider address in the memory space, and wherein the redefining comprises:
    changing the divider address in a first direction when (D−UH)<(LT−D), and
    changing the divider address in a second direction when (D−UH)>(LT−D), wherein D is the divider address, UH is the upper head address, and LT is the lower tail address.

12. The method of claim 11, wherein the first buffer is prevented from accessing memory past the divider address, and wherein the second buffer is prevented from accessing memory before the divider address.

13. The method of claim 11, wherein the redefining further comprises:
  determining whether the first buffer or the second buffer is in a wrap-around condition; and
  halting the redefining when the first buffer or the second buffer is in the wrap-around condition.

14. The method of claim 11, further comprising:
  determining a third memory utilization in a third buffer among the plurality of buffers; and
  redefining a division of the memory space between the second buffer and the third buffer by changing a second divider associated with an address between the second buffer and the third buffer based on the second memory utilization and the third memory utilization.

15. The method of claim 14, wherein the redefining the division between the second buffer and the third buffer further comprises:
  determining a prospective address for the second divider;
  determining a distance between the first divider and the prospective address; and
  halting the redefining of the division between the second buffer and the third buffer when the distance is less than a minimum size threshold distance.

16. The method of claim 11, further comprising:
  waiting a predefined period of time;
  re-determining the first memory utilization and the second memory utilization;
  performing another redefining of the division of memory space based on the re-determined first memory utilization and the re-determined second memory utilization.

17. A method, comprising:
  determining a first memory utilization of a first buffer among a plurality of buffers sharing a memory space, wherein the first memory utilization is determined based on an upper head address and an upper tail address;
  determining a second memory utilization of a second buffer among the plurality of buffers, wherein the second memory utilization is determined based on a lower head address and a lower tail address, and wherein the first buffer and the second buffer are first-in-first-out buffers; and
  repartitioning the memory space by redefining a division of the memory space between the first buffer and the second buffer based on the first memory utilization and the second memory utilization, wherein the division of the memory space is defined by a divider, the divider being associated with a divider address in the memory space between the first buffer and the second buffer, wherein the division of the memory space is redefined by changing the divider address in the memory space, and wherein the redefining comprises:
    changing the divider address in a first direction when (FirstFifoSize−(UH−UT))<(SecondFifoSize−(LH−LT)); and
    changing the divider address in a second direction when (FirstFifoSize−(UH−UT))>(SecondFifoSize−(LH−LT));
    wherein UH is the upper head address, UT is the upper tail address, LH is the lower head address, LT is the lower tail address, FirstFifoSize is a memory allocation to the first buffer, and SecondFifoSize is a memory allocation to the second buffer.

18. The method of claim 17, wherein the first buffer is prevented from accessing memory past the divider address, and wherein the second buffer is prevented from accessing memory before the divider address.

19. The method of claim 17, wherein the redefining further comprises:
  determining whether the first buffer or the second buffer is in a wrap-around condition; and
  halting the redefining when the first buffer or the second buffer is in the wrap-around condition.

20. The method of claim 17, further comprising:
  determining a third memory utilization in a third buffer among the plurality of buffers; and
  redefining a division of the memory space between the second buffer and the third buffer by changing a second divider associated with an address between the second buffer and the third buffer based on the second memory utilization and the third memory utilization.

21. The method of claim 20, wherein the redefining the division between the second buffer and the third buffer further comprises:
  determining a prospective address for the second divider;
  determining a distance between the first divider and the prospective address; and
  halting the redefining of the division between the second buffer and the third buffer when the distance is less than a minimum size threshold distance.

22. The method of claim 17, further comprising:
  waiting a predefined period of time;
  re-determining the first memory utilization and the second memory utilization;
  performing another redefining of the division of memory space based on the re-determined first memory utilization and the re-determined second memory utilization.

23. A network device, comprising:
  a plurality of network ports; and
  a hardware-implemented multi-buffer, comprising:
    a buffer memory comprising a shared memory space, wherein the memory space is shared between at least a first buffer and a second buffer, wherein a dynamic delineation of the memory space between the first buffer and the second buffer is identified by a divider address, and wherein the first buffer is associated with a first of the plurality of network ports and the second buffer is associated with a second of the plurality of network ports;

a dynamic buffer control circuit, wherein the dynamic buffer control circuit comprises:

a control memory configured to store:
the divider address;
a first memory utilization metric associated with the first buffer; and
a second memory utilization metric associated with the second buffer; and one or more comparator circuits configured to compare the first memory utilization metric and the second memory utilization metric, wherein the dynamic buffer control circuit changes the divider address based on the comparison.

24. A method, comprising:

determining a first memory utilization of a first buffer among a plurality of buffers sharing a memory space;

determining a second memory utilization of a second buffer among the plurality of buffers;

repartitioning the memory space by redefining a division of the memory space between the first buffer and the second buffer based on the first memory utilization and the second memory utilization, wherein the division of the memory space is defined by a divider, the divider being associated with a divider address in the memory space between the first buffer and the second buffer, and wherein the division of the memory space is redefined by changing the divider address in the memory space;

determining a third memory utilization in a third buffer among the plurality of buffers; and redefining a division of the memory space between the second buffer and the third buffer by changing a second divider associated with an address between the second buffer and the third buffer based on the second memory utilization and the third memory utilization, wherein the redefining the division between the second buffer and the third buffer further comprises:

determining a prospective address for the second divider, determining a distance between the first divider and the prospective address, and halting the redefining of the division between the second buffer and the third buffer when the distance is less than a minimum size threshold distance.

25. The method of claim 24, wherein the first buffer is prevented from accessing memory past the divider address, and wherein the second buffer is prevented from accessing memory before the divider address.

26. The method of claim 24, wherein the first buffer and the second buffer are first-in-first-out buffers;

wherein the first memory utilization is determined based on an upper head address and an upper tail address; and wherein the second memory utilization is determined based on a lower head address and a lower tail address.

27. The method of claim 26, wherein the redefining further comprises:

changing the divider address in a first direction when (D−UH)<(LT−D); and changing the divider address in a second direction when (D−UH)>(LT−D);

wherein D is the divider address, UH is the upper head address, and LT is the lower tail address.

28. The method of claim 26, wherein the redefining further comprises:

changing the divider address in a first direction when (FirstFifoSize−(UH−UT))<(SecondFifoSize−(LH−LT)); and changing the divider address in a second direction when (FirstFifoSize−(UH−UT))>(SecondFifoSize−(LH−LT));

wherein UH is the upper head address, UT is the upper tail address, LH is the lower head address, LT is the lower tail address, FirstFifoSize is a memory allocation to the first buffer, and SecondFifoSize is a memory allocation to the second buffer.

29. The method of claim 26, wherein the redefining the division of the memory space between the first buffer and the second buffer further comprises:

determining whether the first buffer or the second buffer is in a wrap-around condition; and halting the redefining when the first buffer or the second buffer is in the wrap-around condition.

30. The method of claim 24, further comprising:

waiting a predefined period of time;

re-determining the first memory utilization and the second memory utilization;

performing another redefining of the division of the memory space between the first buffer and the second buffer based on the re-determined first memory utilization and the re-determined second memory utilization.

* * * * *